(12) United States Patent
Grant

(10) Patent No.: US 6,354,980 B1
(45) Date of Patent: Mar. 12, 2002

(54) AUTOMATIC TRANSMISSION SYSTEMS FOR HUMANLY POWERED VEHICLES

(76) Inventor: Frederic Francis Grant, 14505 Eastbrook Ave., Bellflower, CA (US) 90706

( * ) Notice: Subject to any disclaimer, the term of this patent is extended or adjusted under 35 U.S.C. 154(b) by 0 days.

(21) Appl. No.: 09/529,646
(22) PCT Filed: Nov. 10, 1997
(86) PCT No.: PCT/US97/20492
 § 371 Date: Apr. 17, 2000
 § 102(e) Date: Apr. 17, 2000
(87) PCT Pub. No.: WO99/24735
 PCT Pub. Date: May 20, 1999
(51) Int. Cl.⁷ .................................................. F16H 3/74
(52) U.S. Cl. .................... 475/266; 477/298; 280/238
(58) Field of Search ............................... 475/266, 298, 475/299; 280/238, 236, 237

(56) References Cited

U.S. PATENT DOCUMENTS

| | | |
|---|---|---|
| 609,524 A | 8/1898 | Skinner |
| 832,442 A | 10/1906 | Archer |
| 2,301,852 A | 11/1942 | Brown |
| 3,021,728 A | 2/1962 | Shimano |
| 3,769,848 A | 11/1973 | McGuire ................ 74/217 B |
| 3,779,099 A | 12/1973 | Trammell, Jr. ............ 74/594.3 |
| 3,929,025 A | 12/1975 | Perry ..................... 74/217 B |
| 4,490,127 A | 12/1984 | Matsumoto et al. ........ 474/110 |
| 4,713,042 A | 12/1987 | Imhoff ..................... 474/69 |
| 4,836,046 A | 6/1989 | Chappel ................... 74/594 |
| 4,858,494 A | 8/1989 | Healy ....................... 74/781 |
| 4,913,684 A | 4/1990 | Mantovaara et al. ........ 474/12 |
| 4,916,974 A | 4/1990 | Kozakae et al. .......... 475/166 |
| 5,033,991 A | 7/1991 | McLaren .................. 474/78 |
| 5,213,548 A | 5/1993 | Colbert et al. ............. 474/71 |
| 5,399,128 A | 3/1995 | Nürnberger .............. 475/298 |
| 5,527,230 A | 6/1996 | Meier-Burkamp ........ 475/275 |
| 5,562,563 A | 10/1996 | Shoge ..................... 475/298 |
| 5,847,641 A | * 12/1998 | Jinbo ...................... 340/432 |
| 6,015,159 A | 1/2000 | Matsuo .................... 280/238 |
| 6,119,801 A | * 9/2000 | Yamashita et al. ......... 180/205 |

FOREIGN PATENT DOCUMENTS

| | | |
|---|---|---|
| CH | 258751 | 5/1949 |
| GB | 11740 | 7/1897 |
| JP | 40930262 | * 11/1997 |

* cited by examiner

Primary Examiner—Sherry Estremsky
Assistant Examiner—Tisha D. Lewis
(74) Attorney, Agent, or Firm—Fulwider Patton Lee & Utecht, LLP

(57) ABSTRACT

A shiftable bicycle transmission (30) is automatically shifted by automatically sensing output power torque of the transmission (30) automatically converting sensed output power torque to transmission shifting motion, and automatically shifting the shiftable transmission (30) with that transmission shifting motion. A shiftable bicycle (10) driving power transmission has a transmission shifting element (47, 49), a bicycle output power torque sensor (51), and an output power torque-to-transmission shifting motion converter (1, 2, 3) having an output power torque input coupled to that output power torque sensor (51) and having a transmission shifting motion output. Such transmission shifting element (47, 49) is coupled to the transmission shifting motion output of that converter.

58 Claims, 11 Drawing Sheets

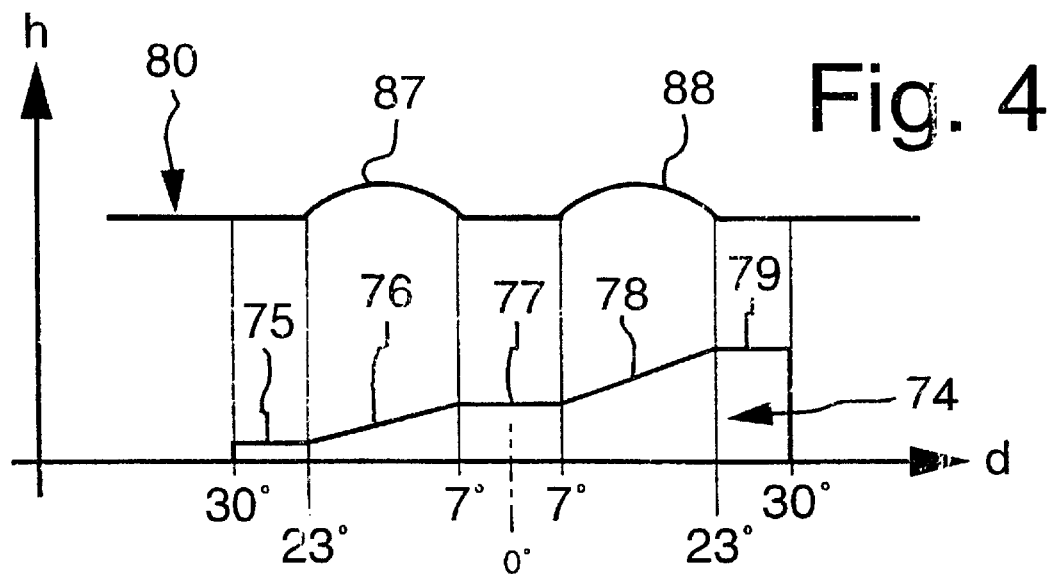
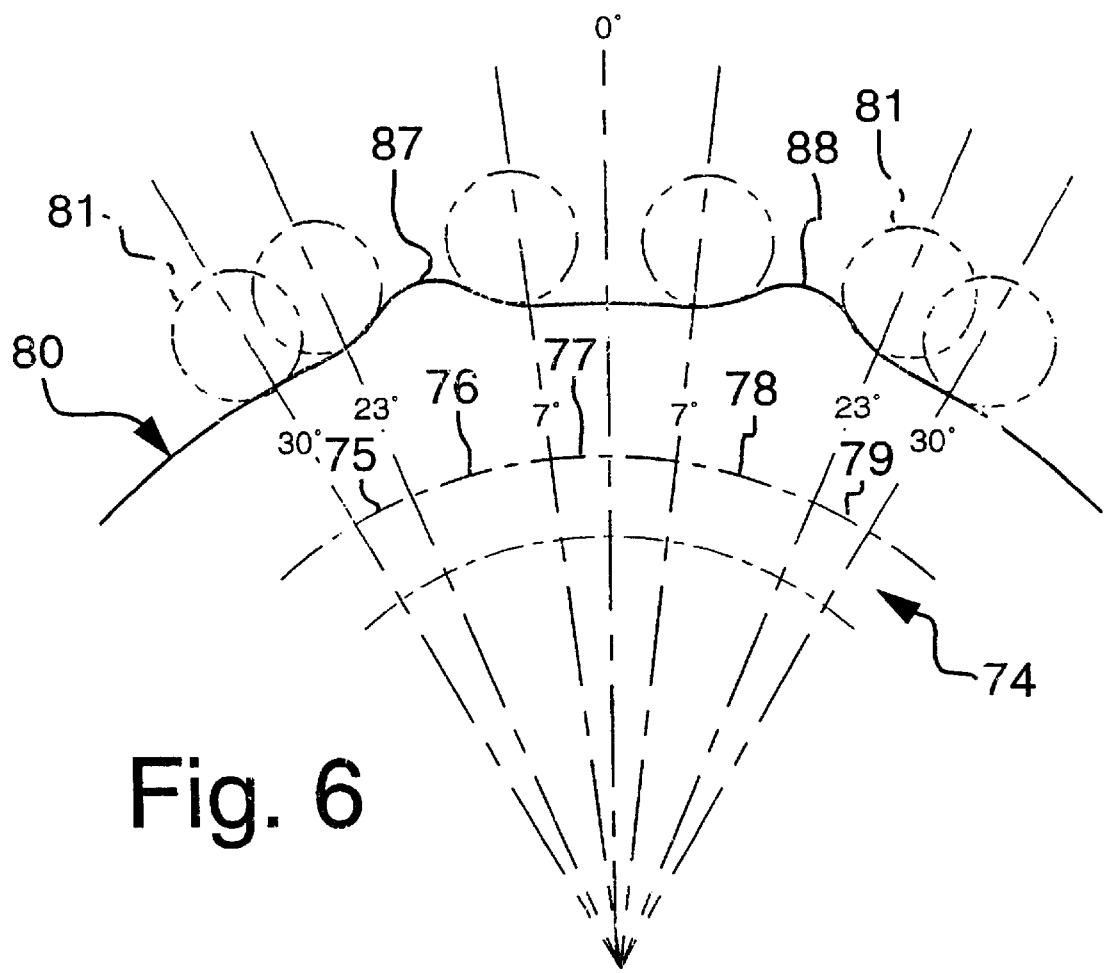

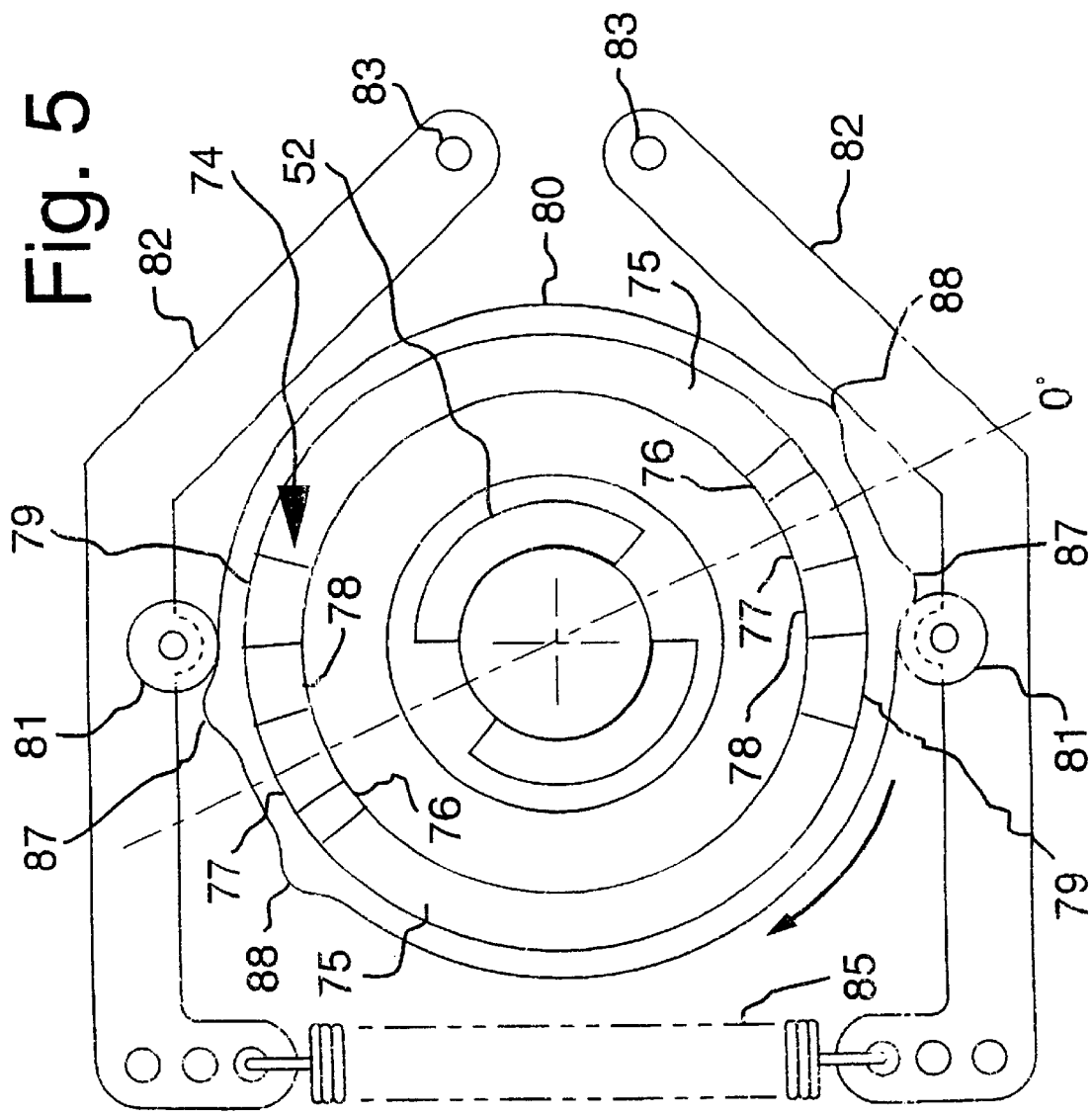

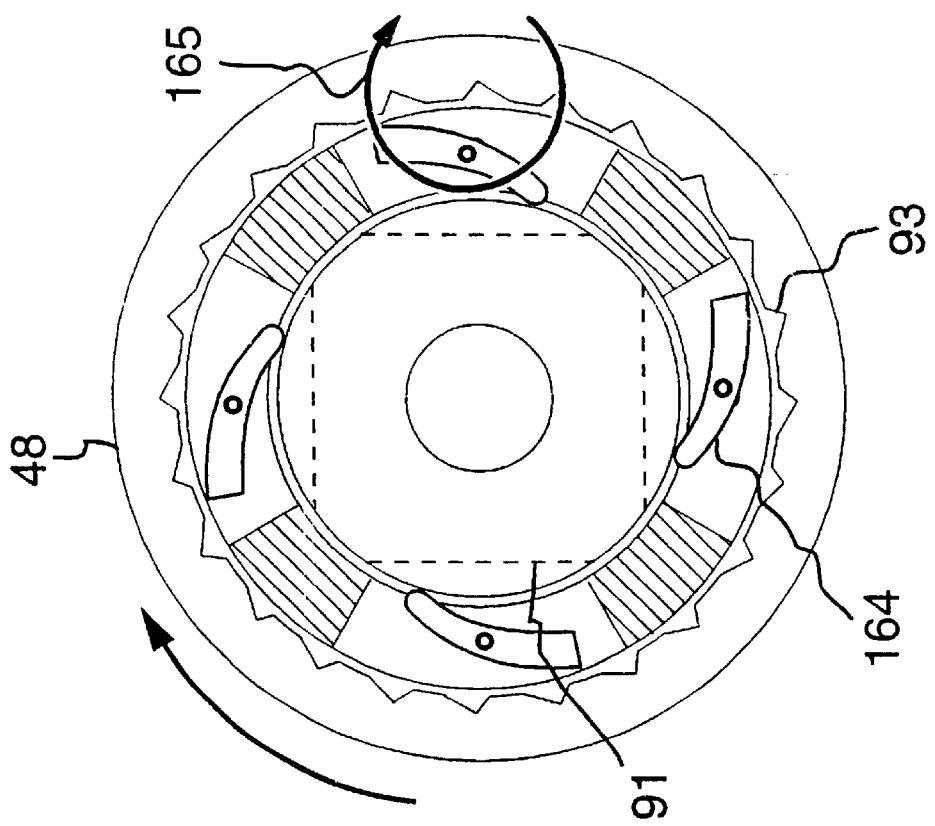
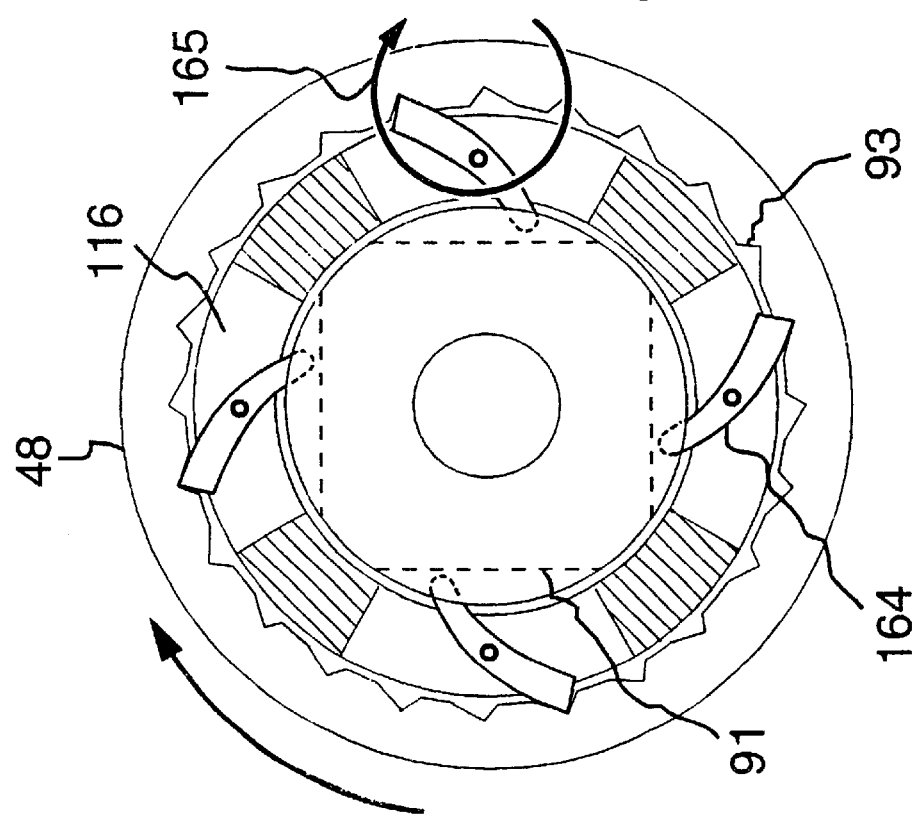

AUTOMATIC TRANSMISSION SYSTEMS FOR HUMANLY POWERED VEHICLES

CROSS REFERENCE

This is the National Phase of International Application PCT/US97/20492, filed on Nov. 10, 1997 by Frederic Francis Grant, the subject inventor and applicant, and published by the International Bureau as WO 99/24735 on May 20, 1999, and herewith incorporated in its entirety by reference herein.

TECHNICAL FIELD OF INVENTION

The technical field of the invention relates to bicycles and other humanly powered vehicles and, more specifically, to automatic and hybrid transmission systems for humanly powered vehicles, herein generically referred to as "bicycles".

BACKGROUND

Forty years ago the automatic transmission for automobiles was for many people what the electric automobile engine starter had been for an earlier generation. Yet, even though bicycles and the like have been around for as long as the automobile, velocipedists all over the world still do not have automatic transmissions that would actually benefit them on their humanly powered vehicles.

Various proposals for automatic bicycle transmissions have not been widely successful. One recent proposal adds three weights, 120 degrees apart, to the rear wheel. These weights add increased air resistance and more than a kilogram of mass to the bicycle. Also, these weights respond to rear wheel speed by centrifugal or centripetal action, shifting a derailleur transmission automatically. In practice, shifting a transmission or derailleurs in response to speed has its disadvantages. Consider for instance approaching an upgrade with a bicycle. In such a case, the cyclist would pedal harder; his or her reaction being to maintain the speed. This, of course, would delay the necessary shifting of the transmission until the hard pedaling cyclist can no longer maintain the speed. By thus losing speed, the cyclist in effect has to work harder in taking the hill, even after the transmission has shifted. Conversely, going downhill and onto a level surface may be hard on the brakes, since that transmission will not shift back until the speed has gone down.

Velocipedists thus continue to shift their bicycles manually in response to the load on their legs and feet. This has led to a continual increase in the number of gears or transmission shift positions with which bicycle transmissions are manufactured, especially for mountainous driving. A high number of transmission shift positions, in turn, is requiring increasing sophistication of bicycle riders as to how and when to shift, and has been discouraging many people from acquiring one of the more advanced racing bicycles or "mountain bikes".

The problem may be gauged from a commercial eight-speed version in which the speed change or change in drive ratio is 22% from the first to the second gear, 15% from the second to the third gear, 18% from the third to the fourth gear, 21% from the fourth to the fifth gear, 20% from the fifth to the sixth gear, 17% from the sixth to the seventh gear, and 22% from the seventh to the eighth gear. That the problem has assumed grotesque proportions may be seen from the example of a modern eighteen-speed derailleur-type bicycle having front sprocket control cam followers and rear sprocket control cam followers providing together the following plethora of drive ratio changes: 22% from the first to the second; 11% from the second to the third; 3% from the third to the fourth; 18% from the fourth to the fifth; nothing from the fifth to the sixth, due to the combined action of the front sprocket and rear sprocket shifts; 4% each between the sixth and the seventh, the tenth and the eleventh, and the fifteenth and the sixteenth; 9% between the seventh and the eight; 2% between the eight and the ninth; 5% between the ninth and the tenth; 7% between the eleventh and the twelfth, the twelfth and the thirteenth, the fourteenth and the fifteenth, and the seventeenth and the eighteenth; with only 6% between the thirteenth and the fourteenth; and 13% between the sixteenth and the seventeenth.

This averages out as a ratio change of 0.07166 per shift of that 18-speed transmission, with actual values being very unequally distributed among the eighteen shift positions. In consequence, more sophistication, concentration and judgment are required for operating the transmission, that what is needed to conduct the bicycle itself.

Known hub type of bicycle transmissions work with one or two planetary gear systems, but are not automatic.

Further problems arise from the fact that recurring torque variations are inherent in many humanly powered drives, such as in bicycles where twice-around drops in torque occur from the fact that the angularly moved pedals in turn have to go through tops and bottoms of their circular motions. This, in turn, has beset efforts to develop an automatic bicycle transmission with problems of erratic shifting due mainly to the above mentioned cyclically recurring power torque variations.

In consequence, a newer approach thus uses a microprocessor for shifting gears which, however, harks back to the power-assisted manual type of transmission of the old Hudson automobile, circa 1938. A new approach obviously is needed, even in the case of electromechanical solutions.

The prior-art inability to evolve a widely acceptable automatic bicycle transmission is regrettable also from environmental and socio-economic points of view, since bicycles cost much less and take much less space than automobiles, put less of a load on the road, do not pollute the atmosphere like automobiles, are much less expensive to operate, and subject the rider to continual salubrious exercise unavailable in any automobile.

SUMMARY OF THE INVENTION

The primary object of the invention is to provide improved automatic bicycle transmission systems.

The invention resides in a method of shifting a shiftable bicycle transmission, comprising, in combination, automatically sensing output power torque of the transmission, automatically converting sensed output power torque to transmission shifting motion, and automatically shifting the shiftable transmission with that transmission shifting motion.

The invention resides also in a shiftable bicycle driving power transmission having a transmission shifting element, comprising, in combination, a bicycle output power torque sensor, and an output power torque-to-transmission shifting motion converter having an output power torque input coupled to that output power torque sensor and having a transmission shifting motion output, such transmission shifting element being coupled to the transmission shifting motion output of the converter.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIG. 4 is a graph illustrating a step-action shifting function according to an embodiment of the invention;

FIG. 5 is an elevation of a shifting mechanism detail seen in FIG. 3 by viewing cam 80 and associated parts in an axial direction from right to left;

FIG. 6 is a diagrammatic view of a detail of FIG. 5 shown in a dynamic manner according to an embodiment of the invention;

FIGS. 8 and 9 are elevations of a ratchet shown respectively in an activated condition and in a disabled condition, such as seen in FIG. 3 at 48 in an axial direction;

MODES OF CARRYING OUT THE INVENTION

Figure 1:
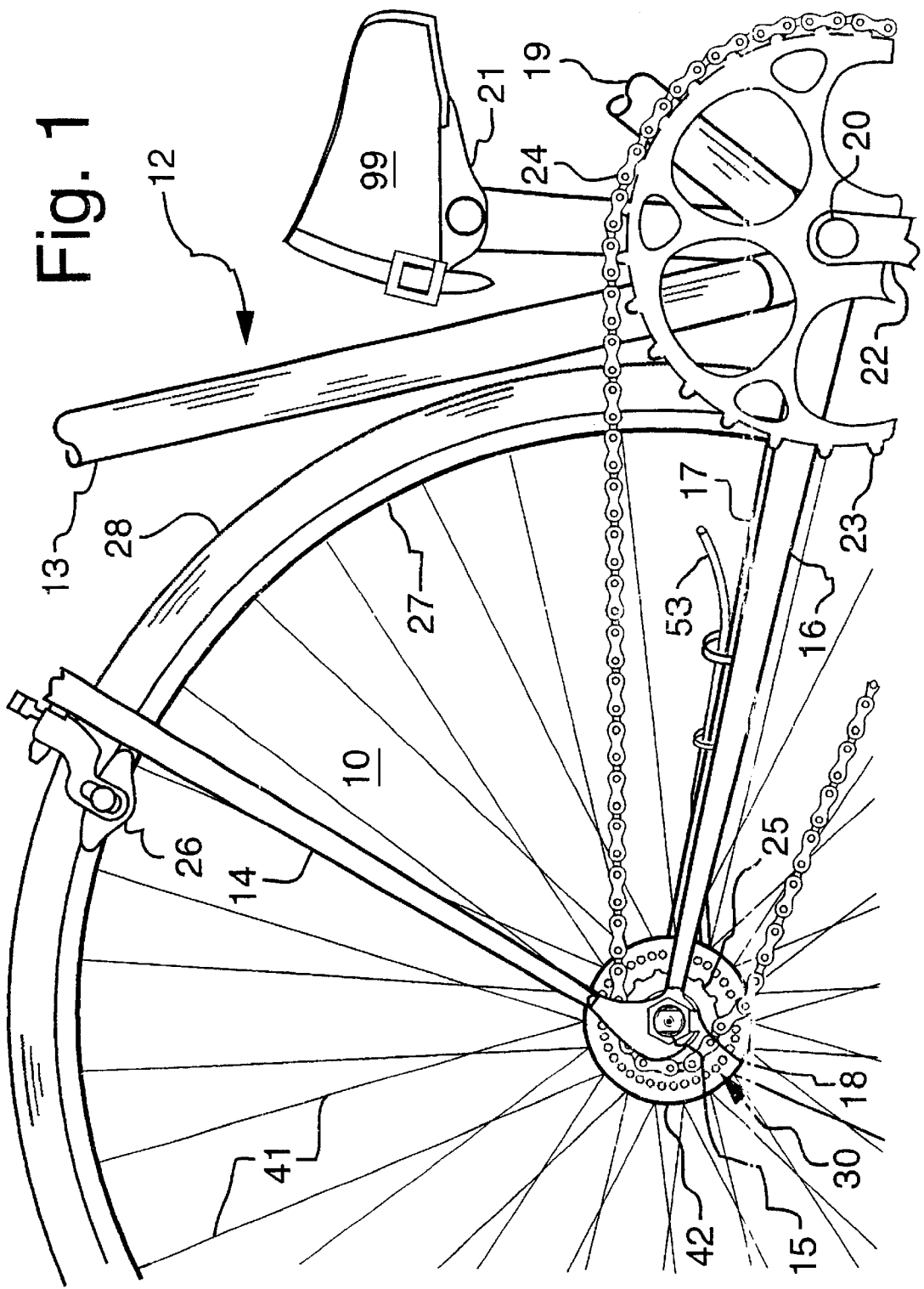
FIG. 1 is a side view of a relevant portion of a bicycle representative of bicycles, tricycles and other humanly powered vehicles within the scope of the invention and including an outline of an automatic transmission according to an embodiment of the invention.

FIG. 1 is a side view of a relevant potion of a bicycle 10, representative of bicycles, tricycles and other humanly powered vehicles within the scope of the invention.

FIG. 1 shows part of the vehicle frame 12 including the so-called seat tube 13 on which the seat post (not shown), which carries the seat or saddle (not shown), is adjustably mounted by the seat lug (not shown). The seat tube 13 is fortified by the seat stays 14 on which the rear wheel axle 15 and thereby the rear wheel is mounted with the aid of the chain stays 16 and 17 and a pair of wheel mounts 18.

Also visible in FIG. 1 is the crank axle 20 rotating in the familiar bearing where the seat tube 13, downtube 19 and chain stays 16 and 17 meet, one of the two pedals 21 and the two crank arms 22 which drive the so-called chain ring 23 and thereby the drive chain 24 which in turn rotates the chain sprocket 25 for propulsion of bicycle 10.

Also seen in FIG. 1 is part of a caliper brake 26 acting on the rim 27 of the rear wheel 28 and being representative of a manually actuable braking system for the bicycle or other humanly powered vehicle.

Other more or less significant parts not shown in FIG. 1 include the familiar top tube in a men's bicycle or the equivalent cross-bar structure in a ladies' bicycle that extends between the seat tube 13 and the front head tube (not shown). That cross-bar or top tube is joined by the downtube 19 in mounting the front head tube in which the handlebar stem (not shown) is mounted for steering of the bicycle by angular movement of the front wheel (not shown) which is mounted between a pair of fork blades of the so-called fork that extends from the lower end of the handlebar stem.

FIG. 1 diagrammatically indicates an automatic transmission according to an embodiment of the invention at 30 with reference to the remaining drawings and to the following description.

Within the scope of the invention, the bicycle may have a front-wheel drive, instead of the rear-wheel drive shown in FIG. 1, or both rear wheels may be driven in the case of a tricycle, for instance.

In the embodiment of FIG. 1, the crank arms 22 carry pedals 21 at their ends whereby the vehicle is humanly powered through a rider's body, including legs and feet. In this respect, bicycles and other vehicles with manually powered cranks are also known and are within the scope of the invention in terms of utility of the disclosed automatic transmission system.

Manually actuated multi-speed transmissions that may be automated pursuant to the subject invention are apparent from the following patents that are herewith incorporated by reference herein:

U.S. Pat. No. 832,442, by J. Archer, issued Oct. 2, 1906, for Variable Speed Gear;

U.S. Pat. No. 2,301,852, by W. Brown, issued Nov. 10, 1942, for Epicyclic Variable Speed Gearing;

U.S. Pat. No. 3,021,728, by Keizo Shimano, issued Feb. 20, 1962, for Three Stage Speed Change Mechanism for a Bicycle; and Swiss Patent 258,751, by Hans Schneeberger, issued Dec. 15, 1948, for a three-speed transmission for bicycles.

This prior-art literature contains some of the sun gear, planet gear and related terminology used also in the present disclosure and in the description of the accompanying drawings.

Basically, the subject invention automatically senses output power torque of a shiftable bicycle transmission. The subject invention thus avoids the disadvantages of the speed-sensitive bicycle transmission mentioned above by way of background. The subject invention thus truly assists the cyclist in automatically shifting the bicycle's transmission whenever the torque necessary for smooth operation in any uphill, downhill or level operation of the bicycle so requires.

The invention automatically converts sensed output power torque to transmission shifting motion, and automatically shifts the shiftable transmission by automatically applying such transmission shifting motion to the transmission shifting element of that shiftable bicycle transmission without waiting for a speed change and without subjecting the cyclist to overexertion.

Figure 2:
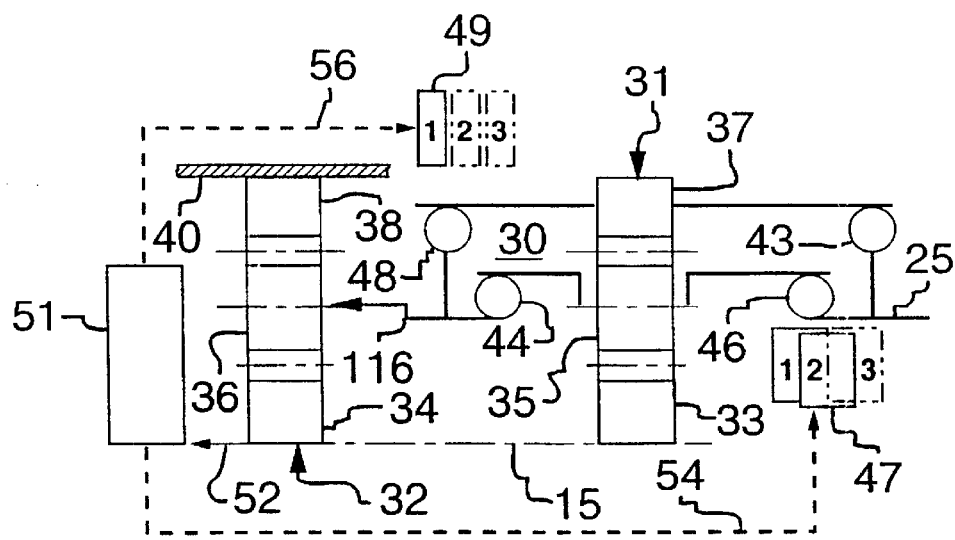
FIG. 2. is a diagrammatic view of an automatic transmission according to an embodiment of the invention.
Figure 3:
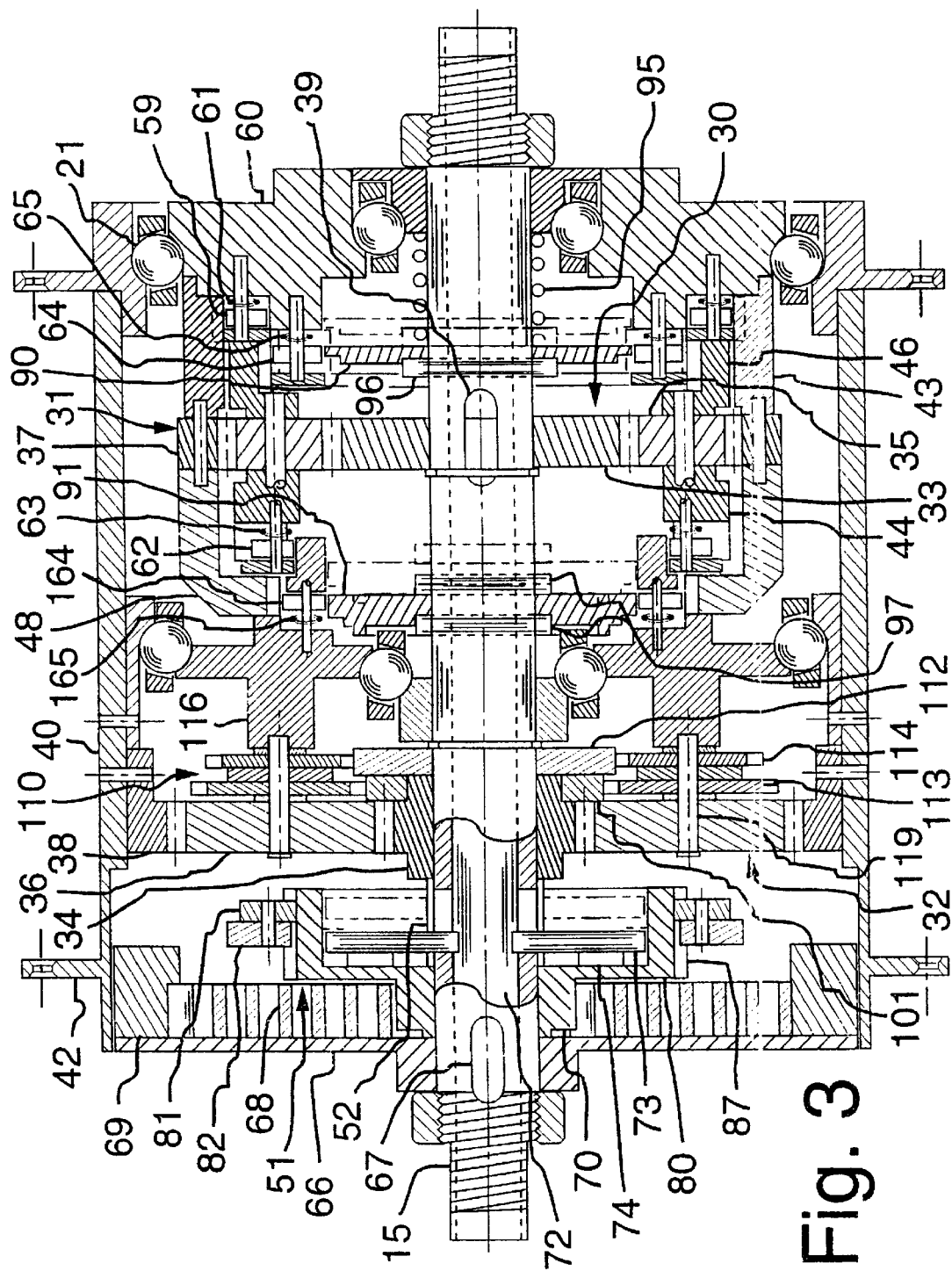
FIG. 3 is a longitudinal section through an automatic transmission according to an embodiment of the invention.
Figure 13:
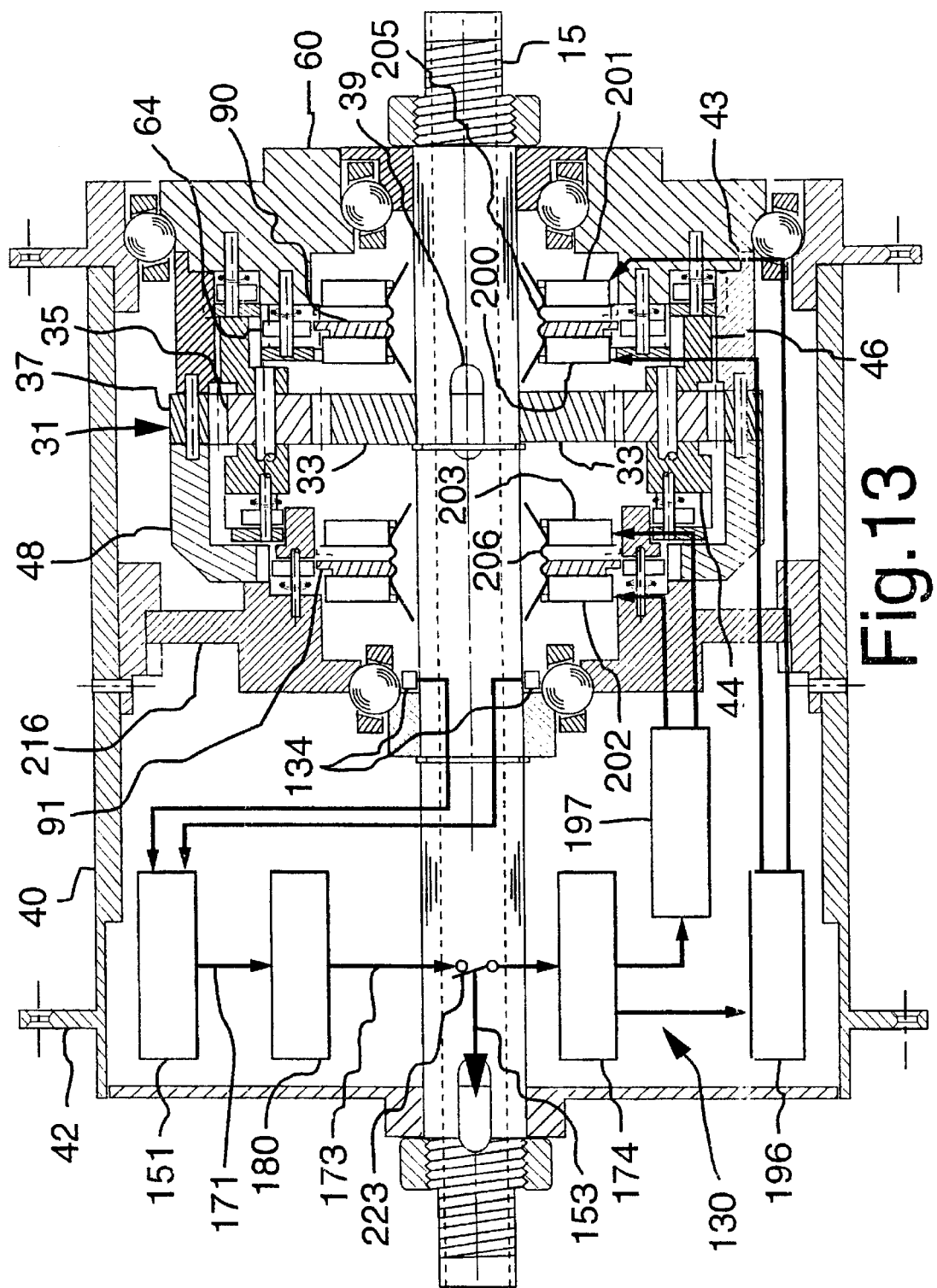
FIG. 13 is a longitudinal section and block diagram of an electromechanical transmission according to a further embodiment of the invention.

FIG. 2 diagrammatically shows an embodiment of the invention that applies these principles. FIGS. 3 and 13 by way of example show a couple of related embodiments of the invention.

In particular, 30 is an automatic transmission having two planetary systems 31 and 32, each having a sun gear 33 or 34 on or around the rear wheel axle 15 shown in FIGS. 1 and 3 and symbolically also in FIG. 2. Sun gear 33 is keyed to shaft 15, such as shown at 39 in FIGS. 3 and 13. Planetary systems 31 and 32 also have planet gears 35 or 36 around the corresponding sun gear 33 or 34 and meshing therewith. Each of these planetary systems also has a ring gear 37 or 38 internally meshing with the corresponding planet gears 35 or 36. The ring gear 38 of the second or sensor planetary system 32 carries the wheel hub 40 to which the spokes 41 of the rear wheel 28 are attached, such as via spoke spider anchors 42. Of course, within the scope of the invention, the part 40 may symbolize other kinds of driven wheel systems of humanly powered vehicles.

The automatic transmission 30 in FIG. 2 includes a first ratchet 43 that connects the humanly powered sprocket 25 at the input of the transmission 30 to the internal ring gear 37 of the first planetary system 31, except when it is free-wheeling, such as mentioned below. That transmission 30 also includes a second ratchet 44 that interconnects the planet gears 35 and 36 of the two planetary systems 31 and 32, except when it is free-wheeling, such as also mentioned below. Transmission 30 further includes a third ratchet 46 that can be disabled by the gear shift mechanism, as indicated in the first set 47 of block positions 1, 2, 3 shown in FIG. 2, assuming a three-speed transmission by way of example. The transmission 30 moreover includes a forth ratchet 48 that also can be disabled by the gear shift mechanism, as indicated in the second set 49 of block positions 1, 2, 3 shown in FIG. 2. If enabled, the third ratchet 46 connects the sprocket 25 to the planetary gears 35 of the first planetary system 31. Alternatively or additionally, the fourth ratchet 48, if enabled, either connects the sprocket 25 via the first ratchet 43 or connects the ring gear 37 to the planet gears 36 of the second planetary system 32, for the various shift positions.

In the embodiment of FIGS. 2 and 3, the first and second ratchets 43 and 44 are mechanically interconnected through the internal ring gear 37 of the first planetary system 31. That is a practical mechanical arrangement in some embodiments, but that ring gear could, for instance, be internal of a common structure of both the first and fourth ratchets 43 and 48. In other words, both the first and fourth ratchets 43 and 48 could be interconnected directly as long as they are also connected to the ring gear 37, such as for transmission of human power through the first planetary system 31 in certain shift positions. Also within the scope of the invention, a similar arrangement is possible for the second and third ratchets 44 and 46, which could be interconnected directly as long as they are also connected to planet gears 35 of the first planetary system 31.

As far as gear shifting is concerned, blocks 1 of the first and second set of blocks 47 and 49 are shown in solid outline, indicating that both second and forth ratchets 46 and 48 are disabled in the first shift position (1) of the automatic transmission. Accordingly, the humanly powered sprocket input 25 drives the wheel hub 40 through the ratchet 43, ring and planet gears 37 and 35 of the first planetary system 31, and through the ratchet 44 and the planetary gear 36 and ring gear 38 of the second planetary system 32. This shift position (1) thus may serve to provide low-speed operation with high torque for the bicycle or other humanly powered vehicle.

Block position 2 is still solid in the first set of blocks 47 for the third ratchet 46, whilst block 2 is dotted in the second set of blocks 49 for the fourth ratchet 48, indicating that the third ratchet 46 is still disabled, while the forth ratchet 48 is not disabled, but is active or enabled in the second shift position (2) of the automatic transmission. Accordingly, the humanly powered sprocket input 25 drives the wheel hub 40 through the first ratchet 43, enabled fourth ratchet 48 directly or via ring gear 37 of the first planetary system 31, and through the planetary gears 36 and ring gear 38 of the second planetary system 32; the ratchet 44 being free-wheeling at this point. This shift position (2) thus may serve to provide what may be called a straight or direct drive, such as for a mid-speed, mid-torque kind of operation of the bicycle or other humanly powered vehicle.

Conversely, the blocks 3 of the first and second set of blocks 47 and 49 are shown in dotted outline, indicating that both second and forth ratchets 46 and 48 are not disabled, but are enabled or active in the third shift position (3) of the automatic transmission. Accordingly, the humanly powered sprocket input 25 drives the wheel hub 40 through the ratchet 46, planetary gear 35 and ring gear 37 of the first planetary system 31, and through the ratchet 48, planetary gear 36 and ring gear 38 of the second planetary system 32; the ratchets 43 and 44 being free-wheeling at this point. This shift position (3) thus may serve to provide a high-speed, low-torque kind of operation for the bicycle or other humanly powered vehicle.

While both planetary gear systems 31 and 32 participate in the power transmission from the driven sprocket input 25 to the wheel 28 or wheel hub 40 output, depending on shift position, the second planetary system 32 may be considered part of the torque sensor system according to a preferred embodiment of the invention, since the primary role of such second planetary system in the gear shifting function of the automatic transmission 30 is to sense output torque of that transmission for automatic shifting.

Accordingly, the second planetary system 32 is connected to a torque sensor 51 shown in block diagram form in conjunction with the remainder of FIG. 2, but being representative of or including any apparatus that automatically senses output power torque, such as indicated by the arrow 52, and that automatically converts sensed output power torque to transmission shifting motion in steps corresponding to shift positions, such as steps 1, 2, 3, of one or more transmission shifting elements, such as indicated at 47 and 49 in FIG. 2.

As further indicated by dotted lines 54 and 56, the shiftable transmission 30 is automatically shifted by automatically shifting the transmission shifting element with the converted transmission shifting motion in steps, such as 1, 2, 3, in the case of a three-speed transmission.

In this respect, while separate sets of shifting blocks 47 and 49 have been shown in FIG. 2 for the ratchets 46 and 48, respectively, there may in fact be one shifting element for the entire transmission, as is generally the case in manually actuated transmissions, such as those disclosed in the above mentioned incorporated patents.

In terms of FIG. 3, for example, the transmission 30 may have an input rotor 60 that may mount the sprocket 25 for application of human power to the transmission and hence to the driven wheel 28. This rotor is coupled to pawls 59 which with bias springs 61 are part of the first ratchet 43. The second ratchet 44, in turn, has pawls 62 spring biased at 63. Such ratchets may be of a conventional type that permit one-way operation for power transmission in one direction, and that are free wheeling in the opposite direction or sense of rotation.

Accordingly, the humanly driven input rotor 60 drives the bicycle 10 through first and second ratchets 43 and 44, via ring gear 37 and planetary gears 35 of the first planetary system 31 and through planetary gears 36 and ring gear 38 of the second planetary system 32. This represents the above mentioned shift position (1) for low-speed operation with high torque.

The torque sensor 51 in the embodiment of FIG. 3 operates through the sun gear 34 of the second planetary system 32 in automatically sensing output power torque of transmission 30. Such transmission has an end cover 66 keyed to the shaft 15, such as at 67, in order to be stationary relative to the hub 40 and other moveable parts. The heart of the torque sensor in the embodiment of FIG. 3 is a torque measuring spring 68 that is anchored to end cover 66 by an annular spring housing structure 69. In principle, that spring may be a type of clock spring having one or more turns or may in fact be a spring system composed of several spiral or other types of springs. The spring or spring system used at 68 can be adapted to the kind of load or system employed or can even be personalized to the owner and user of the particular bicycle, for optimum gear shifting comfort.

The inner end of spring 68 is connected to an annulus 70 connected by coupling 52 to the sun gear 34 of the second planetary system. Both that annulus and that sun gear are angularly moveable relative to shaft 15. Accordingly, torque generated by the bicycle rider not only drives the bicycle wheel 28 through ring gear 38, but also tensions the spring 68 through sun gear 34 of the second planetary system 32 thereby sensing output power torque and storing energy for transmission shifting.

The invention automatically converts sensed output power torque to transmission shifting motion and automatically shifts the shiftable transmission 30 by automatically applying that transmission shifting motion to a transmission shifting element. By way of example, the shaft 15 may at least partially be hollow cylindrical, and the transmission shifting element may be or include a push rod 72 in that hollow shaft.

The push rod includes and is actuated by a push bar 73 riding on the face of a cam 74, which, for example, may be of an axially acting type. A development of an essential portion of cam 74 on a plane is seen in FIG. 4, and a frontal view of that cam 74 is seen in FIG. 5, indicating alternative flat and sloped sections 75, 76, 77, 78 and 79 of increasing or decreasing height in axial direction, depending on the sense of rotation imparted by the sun gear 34 of the second planetary system 32. A like set of sections 75 to 79 preferably is provided on cam 74 diametrically opposite the first-mentioned set 75 to 79, such as shown in FIG. 5.

The annulus 70 angularly moves cam 74 as measured output power torque tensions and conversely relaxes spring 68. Cam slopes 76 and 78 act on the push bar 73 and thereby on push rod 72 to shift gears among several positions, such as those indicated as (1), (2), and (3) in conjunction with FIG. 2, for instance.

In practice, an automatic shifting mechanism may overreact, with torque exerted by the bicycle rider and shifting of gears in effect "hunting" each other, manifesting itself in an annoying continual up and down shifting of the automatic transmission. Within the scope of the invention, some form of damping could be employed to alleviate the problem. However, embodiments of the invention prefer provision of some hysteresis to avoid "hunting" within the automatic transmission. In practice, such hysteresis may be realized by a built-in reluctance of the automatic transmission to shift gears.

By way of example, a shift control hub or cam 80 may be used for that purpose, such as shown in FIGS. 3 and 5. Such cam may cooperate with rollers 81 pivoted on pivot arms 82 or other cam followers riding for instance on the periphery of cam 80. Such pivot arms may, for instance, be supported by hinge pins 83 anchored in the ring structure 69 shown in FIG. 3 as a spring housing and support. A tension spring 85 may act on the roller support arms 82 in order to tension rollers 81 into contact with cam 80.

The cam 80 may be of a radially acting type wherein pairs of cam protrusions or bumps 87 and 88 cooperate with rollers 81 to realize the desired reluctance or hysteresis of the shifting mechanism to engage in senseless "hunting". As seen in FIG. 6, for instance, a single cam follower 81 with a single pair of cam bumps 87 and 88 could be used within the scope of the invention. However, FIG. 6 can also be viewed as an enlargement of a peripheral region of cam 80, which includes a like diametrically opposed symmetrical peripheral region.

FIG. 6 shows phantoms of a roller or cam follower 81 as a peripheral region of the cam 80 moves relative thereto. In the illustrated embodiment, it is the cam that moves angularly, while the cam follower stands still peripherally and only moves radially in response to bumps 87 and 88. FIG. 6 is of a polar coordinate nature, whilst its related FIG. 4 is of a cartesian character, wherein radial extent of cam 80 and height of cam 74 and are symbolized as h in terms of angular movement or development d.

In FIGS. 4 and 5, zero degrees, 0°, are positioned in a mid range that, for instance, may correspond to a shift position (2), such as mentioned in conjunction with FIG. 2. Bumps 87 and 88 of cam 80 effectively reign in that mid position by preventing the automatic transmission from dwelling between shift positions and from shifting prematurely. In particular, bumps 87 and 88 effectively prevent the pusher bar 73 from dwelling on either cam slope 76 or cam slope 78. Bumps 87 and 88 of cam 80 cooperate in releasably retaining pusher bar 73 within the plus and minus 7° range of the second flat 77 of cam 74 representing, for example, shift position (2).

By way of further example, the above mentioned shift position (1) may correspond to the flat 75 of cam 74 and an angular range between 30° and 23° counterclockwise of the mid range represented by flat 77. The transmission shifting mechanism has to overcome bump 87 before it can shift either way between shift positions (1) and (2).

Conversely, the above mentioned shift position (3) may correspond to the flat 79 of cam 74 and an angular range between 30° and 23° clockwise of the mid range represented by flat 77. The transmission shifting mechanism has to overcome bump 88 before it can shift from position (2) forward to position (3), or from such position (3) back to position (2).

Figure 7:
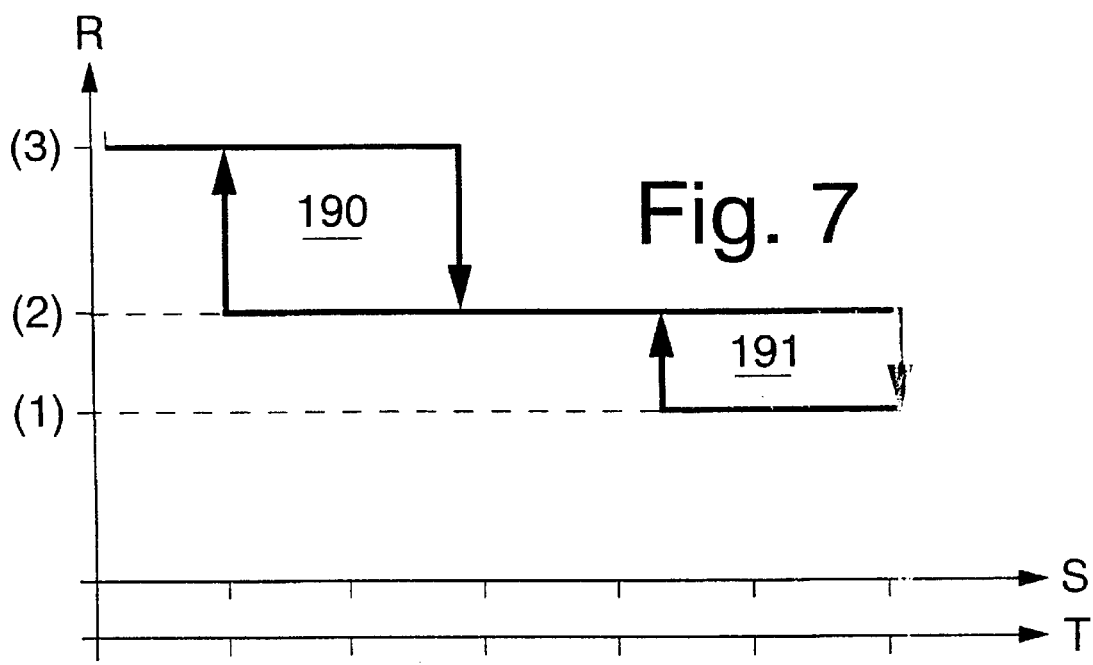
FIG. 7 is a graph illustrating hysteresis in gear shifting according to an embodiment of the invention.

In this respect, the preferred embodiment of the invention introduces the desired hysteresis, as may, for instance be seen from the graph of FIG. 7 representing the wheel 28 to pedal 22 ratio R as a function of torque T of wheel 28 and also as a function of torque S of sensor spring 68. As may be seen from FIG. 7 there is a hysteresis 190 between mid and high gears (2) and (3), and another hysteresis 191 between low and mid gears (1) and (2). Tension spring 85 and other parameters of the system may be dimensioned for realization of optimum hystereses for various given purposes.

Preferred embodiments of the invention thus provide stable and accurate shifting of gears for superior comfort and utilization of the human power of the bicycle rider.

Free-wheeling ratchets of the type of the first and second ratchets 43 and 44 are well known. Mechanisms for alternatively enabling and disabling ratchets are also known and may be employed in automatic transmission 30 with the shifting element 72 (push rod) etc. actuating such mechanisms.

In this respect, the humanly powered rotor 60 drives both the first ratchet 43 and the shiftable third ratchet 46. In FIG. 3, these ratchets are both internal ratchets wherein pawls 59 and 64 are internal to the array of ratchet teeth of these ratchets.

Planet gears 35 of the first planetary system 31 drive the second ratchet 44, which in FIG. 3 is an external ratchet wherein pawls 62 are external to an array of ratchet teeth of that ratchet. This in effect accommodates the fourth ratchet 48 in its design around the second ratchet 44.

In FIG. 3 the fourth ratchet 48 is an internal ratchet wherein the array of ratchet teeth drive the pawls 164 as indicated by arrows in FIGS. 8 and 9, but under the control of a ratchet shifter or pawl disabler 91. As seen in FIG. 3, pawls 164 are arranged in a slot of an output rotor 116 that may be a spider for planet gears 36 of the second or torque sensing planet system 32.

FIG. 8 and 9 by way of example show partial cross-sections of the fourth ratchet 48 which are also illustrative of possible executions of the first, second and third ratchets shown in FIG. 3, except that the first and second ratchets 43 and 44 would not have a ratchet shifter or disabler 90, 91, the configurations of the first and second ratchets 43 and 44 would be mirror images of the fourth ratchet, with the pawls driving the ratchet, and the third ratchet 46 is an external ratchet as mentioned above.

The pawl bias springs are only shown as torque 165 in FIGS. 8 and 9. The heart of each shiftable ratchet is a ratchet shifter 90 for third ratchet 46 and a ratchet shifter 91 for fourth ratchet 48. Such elements disable the ratchet 46 or 48 in their axial position such as shown in FIG. 9 for the ratchet 48, by depressing the active ends of pawls 164 away from the corresponding ratchet teeth 93. Third and fourth ratchets 46 and 48 are thus disabled from transmitting any power in their condition illustrated in FIG. 3.

Conversely, the ratchet shifters 90 and 91 in their axial position, such as illustrated for ratchet 48 in FIG. 8, enable the ratchet 46 or 48 by sufficiently clearing ends of pawls 64 or 164 to permit rotation of these pawls by their spring bias 65, 165 until active ends of these pawls 64 or 164 are positioned for engagement with the ratchet teeth 93 in one sense of rotation of the ratchet 46 or 48.

Such shifting may, for instance, be effected with the above mentioned cam 74 and a corresponding bias spring 95 acting conversely on pusher bar 73 which, in turn, shifts the central shifting rod 72 and thereby a pusher bar 96 for the ratchet shifter 90 and pusher bar 97 for the ratchet shifter 91. Passive and active conditions of ratchets 46 and 48 are indicated by solid and phantom illustrations thereof in FIG. 3. Reference may in this respect be had to FIG. 2, to shifting blocks 47 and 49 and to the operational description thereof. Within the scope of the invention, ratchet shifters 90 and 91 may be of different width or thicknesses for different shifting effects, such as indicated by shifting blocks 47 and 49 in FIG. 2, for instance.

Within the scope of the invention, different configurations or types of pawls may be used in the requisite ratchets, or sprag-type or other forms of one-way clutches may be employed for what is herein referred to as "ratchets."

According to an embodiment of the invention, input power torque applied to the transmission is equalized by coupling each foot of a bicycle rider to a pedal of the bicycle. To this end, foot-to-pedal couplings from each foot of a bicycle rider to each bicycle pedal may be associated with the automatic transmission. One example of such foot-to-pedal couplings is seen at 99 and may be representative of the familiar toe clips and toe straps of racing bikes and other upscale bicycles or other pedal couplings attached to riders' shoes. Such foot-to-pedal couplings aid skilled, attentive riders to exert power not only on the downward angular motion of the pedal, but also during other phases, including upward motion and angular motion through tops and bottoms of the pedalling cycles. In conjunction with automatic transmissions pursuant to the invention, this in practice helps to prevent erratic shifting of the automatic transmission.

Figure 10:
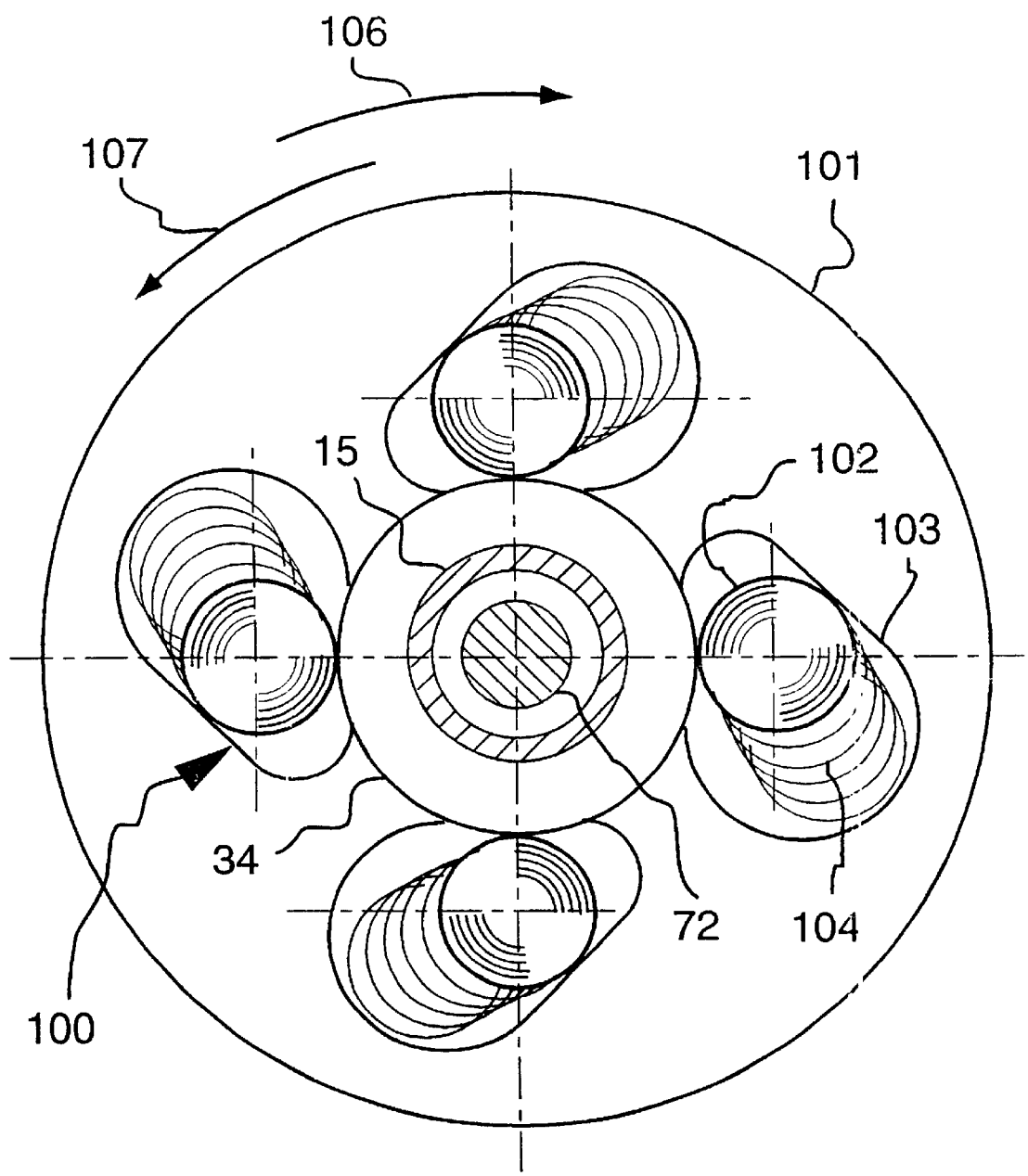
FIG. 10 is a view of a one-way clutch according to an embodiment of the invention, as seen in FIG. 3 at 101 in an axial direction from right to left.

Additionally or more typically alternatively, a preferred embodiment of the invention adds an internal anti-erratic shifting feature to its automatic transmission which retards upshifts as compared to corresponding downshifts. By way of example, a one-way type of clutch, such as shown in FIG. 10, may be employed in or with the torque sensor 51 to retard transmission upshifts relative to downshifts.

Such a one-way clutch 100 may, for instance, act on the sun gear 34 of the second or sensing planetary system 32. The clutch may ride on a cylindrical extension of that sun gear and may itself constitute or be included in an auxiliary sun gear 101 rotating on that cylindrical extension, such as seen in FIGS. 3, 10 and 11.

The one-way clutch 100 may include unidirectionally biased clutch elements or rollers 102. In the embodiment of FIG. 10, the clutch has tapered cavities 103 having internal surfaces parallel to axes of the gears and being open at the axial extension of sun gear 34. Rollers 102 are located in these cavities and are biased against that extension by springs 104 causing rollers 102, extension of sun gear 34 and auxiliary sun gear 101 to bind during relative movement indicated by arrow 106. Conversely, biased rollers 102 are able to disengage from that bind during relative angular motion 107. Unidirectional clutch 100 thus is able to retard upshifts that would occur prematurely during fluctuations of the pedalling power or erratically as a reaction to spring-mass oscillations of the drive structure.

Figure 11:
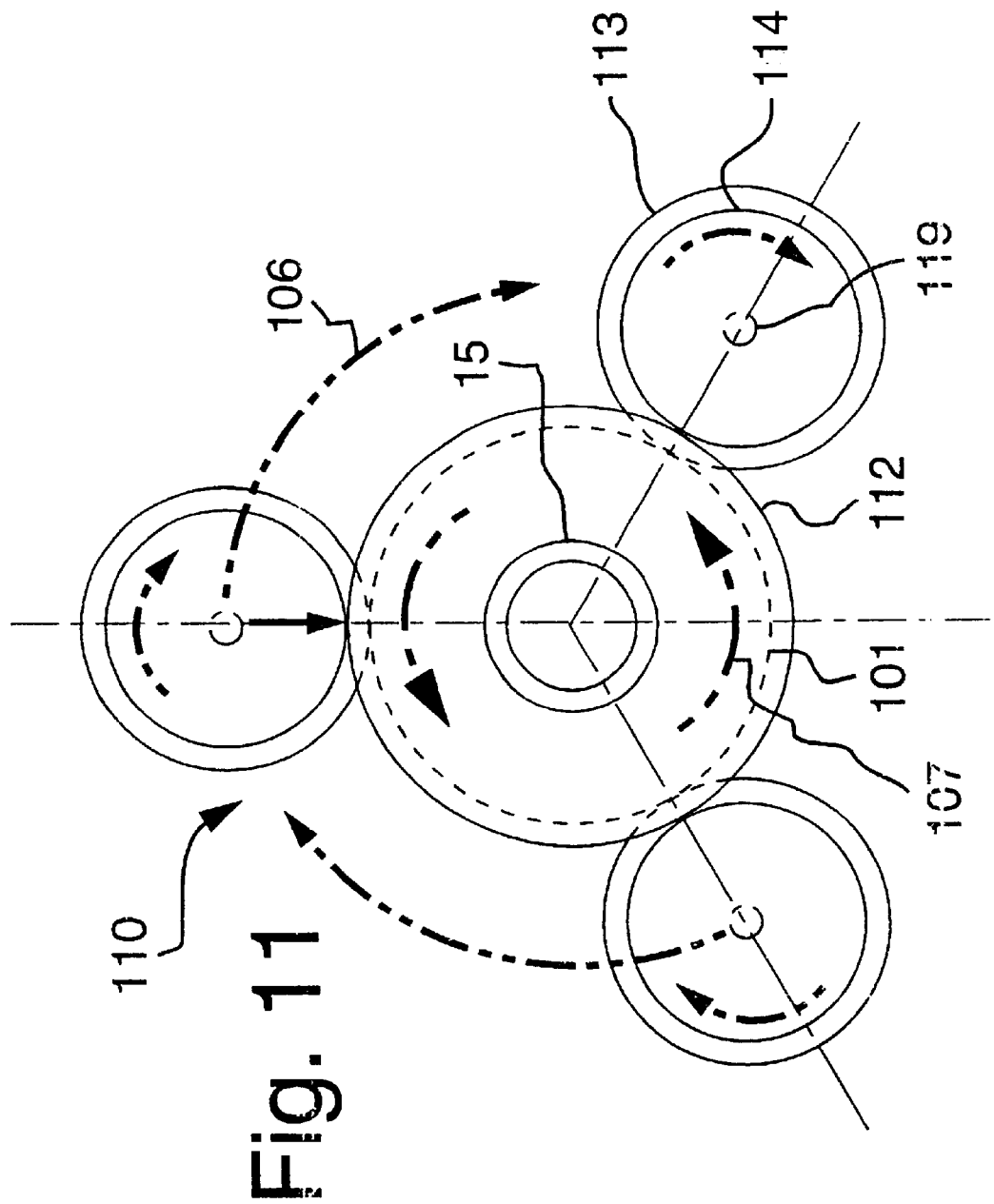
FIG. 11 is an elevation of auxiliary planetary gearing according to an embodiment of the invention, as seen in FIG. 3 at 110 in an axial direction from right to left.

Clutch 100 or its sun gear 101 may be part of further planetary gearing 110, such as shown in FIGS. 3 and 11. Since the second sun gear 112 covers the first sun gear 101 in FIG. 11, reference need to be had to FIG. 10 for a showing of the clutch 100 in such first sun gear 101.

Either an even or an odd number of planet gears may be used in any planetary system herein disclosed. For example, FIGS. 3 and 13 show sun gear systems 31, 32 and 110 that have an even number of planet gears. On the other hand, FIG. 11 shows an odd number of planet gears with the understanding that an even number of planet gears may alternatively be employed.

In addition to its first sun gear 101, gearing 110 may include the second sun gear 112 which may be keyed to shaft 15 to be relatively stationary. Such second sun gear 112 preferably is of larger diameter than the first sun gear 101. The preferably smaller sun gear 101 has planet gears 113, and the preferably larger sun gear 112 has further planet gears 114, each being preferably of smaller diameter than each of the planet gears 113.

Planet gears 113 and 114 are interconnected to rotate in synchronism and are journalled between planet gears 36 and a spider 116 of such planet gears 36 of the second or torque sensing planetary system 32. Such spider may serve as an output rotor of the second and fourth ratchets 44 and 48 and may be present, even if the auxiliary gearing 110 is not used in any different embodiment of the invention.

In particular, planet gears 114 have pivots 119 connected to spider 116 and planet gears 36 of second planetary system 32 to revolve in synchronism therewith about their stationary sun gear 112. Planet gears 113 are connected to these planet gears 114 to rotate in synchronism therewith and to angularly move their sun gear 101 slowly in a direction 107 that is opposite to the direction of rotation 106 of spider 116.

In the illustrated embodiment, the pitchline velocity of sun gear 101 is proportional and opposite in direction to the velocity at 106 multiplied by the difference of radii of planet gears 113 and 114 divided by the radius of planet gear 113. According to a preferred embodiment of the invention, gear ratios within auxiliary gearing 110 are selected to assure that during each minimum torque quarter turn of each pedal 21, the clutch 100 in sun gears 101 restrains the sun gear 34 and hence the angular movement of cam 80 through coupling 52 so that the automatic transmission cannot upshift as a result of such minimum torque phase.

The embodiment of the invention shown in FIGS. 3, 10 and 11 retards upshifts without affecting downshifts.

In particular, as the cyclist applies torque through the automatic transmission, the second sun gear 34 torques the sensor spring 68 via coupling 52 which thereby stores energy, reaching a point at which cams 74 and 80 downshift the transmission via shifting bar 73 and element 72. Two such downshifts are illustrated in succession in FIG. 7 by downwardly pointing arrows. Auxiliary planetary gearing 110 and its clutch 100 have no effect on such downshifting, inasmuch as the extension of the sensing sun gear 34 then is angularly moving clockwise as seen in FIG. 10 relative to the auxiliary sun gear 101 so that clutch rollers 102 would move out of any locking position at surfaces 103 against the bias of springs 104.

Sensing spring 68 stores energy imposed thereto by sensed output torque. If the torque applied by the cyclist decreases, such energy previously stored in sensing spring 68 tends to angularly move the sensing sun gear 34 counterclockwise as seen in FIG. 10. In the absence of clutch 100 this would effect upshifting of the transmission via cams 74 and 80 whenever torque applied by the cyclist decreases.

However, the auxiliary planet system 110 is turning its sun gear 101 in the direction of arrow 107 as long as the bicycle is going forward. Due to the action of clutch 100 neither the sensing sun gear 34, nor its coupling 52 can go faster counterclockwise than the auxiliary sun gear 101. In consequence, upshifting via cams 74 and 80 is retarded until the energy stored in or by sensing spring 68 balances with the sensed output torque, whereupon upshifting occurs, such as indicated in succession by upwardly pointing arrows in FIG. 7 for two shifting operations.

The currently discussed embodiment of the invention meters the stored energy of sensing spring 68 in the automatic conversion of sensed output torque to transmission shifting motion to the effect that spring-mass oscillations occurring in the system are dampened, if not precluded, and that inevitable fluctuations in bicycle operation, such as from driving torque diminutions during pedaling through peaks of the pedal rotations, cannot eventuate erratic shifting or dithering of the automatic transmission.

By way of example, stored energy in sensing spring 68 is metered to retard upshifts in the shifting of the shiftable transmissions 30 and 230. In this respect, clutch 100 and auxiliary planetary gearing 110 may be employed to meter the rate at which sensing spring 68 releases its energy, such as disclosed above with the aid of FIGS. 3, 10 and 11. In apparatus terms, the bicycle output power torque sensor 51 may include a sensed output torque energy storing device 68 and the output power torque-to-transmission shifting motion converter 70, 74, 80 includes a stored energy metering device 101, 110. Such stored energy metering device may be a unidirectional upshift retarding device, such as in the form of or including one-way clutch 100.

According to a further embodiment of the invention, the automatic transmission may be arrested at a given shift position. What may be termed a "manual shift arrester" 123 may be made to act on part of the automatic transmission, such as on an element of its torque sensor 51.

Figure 12:
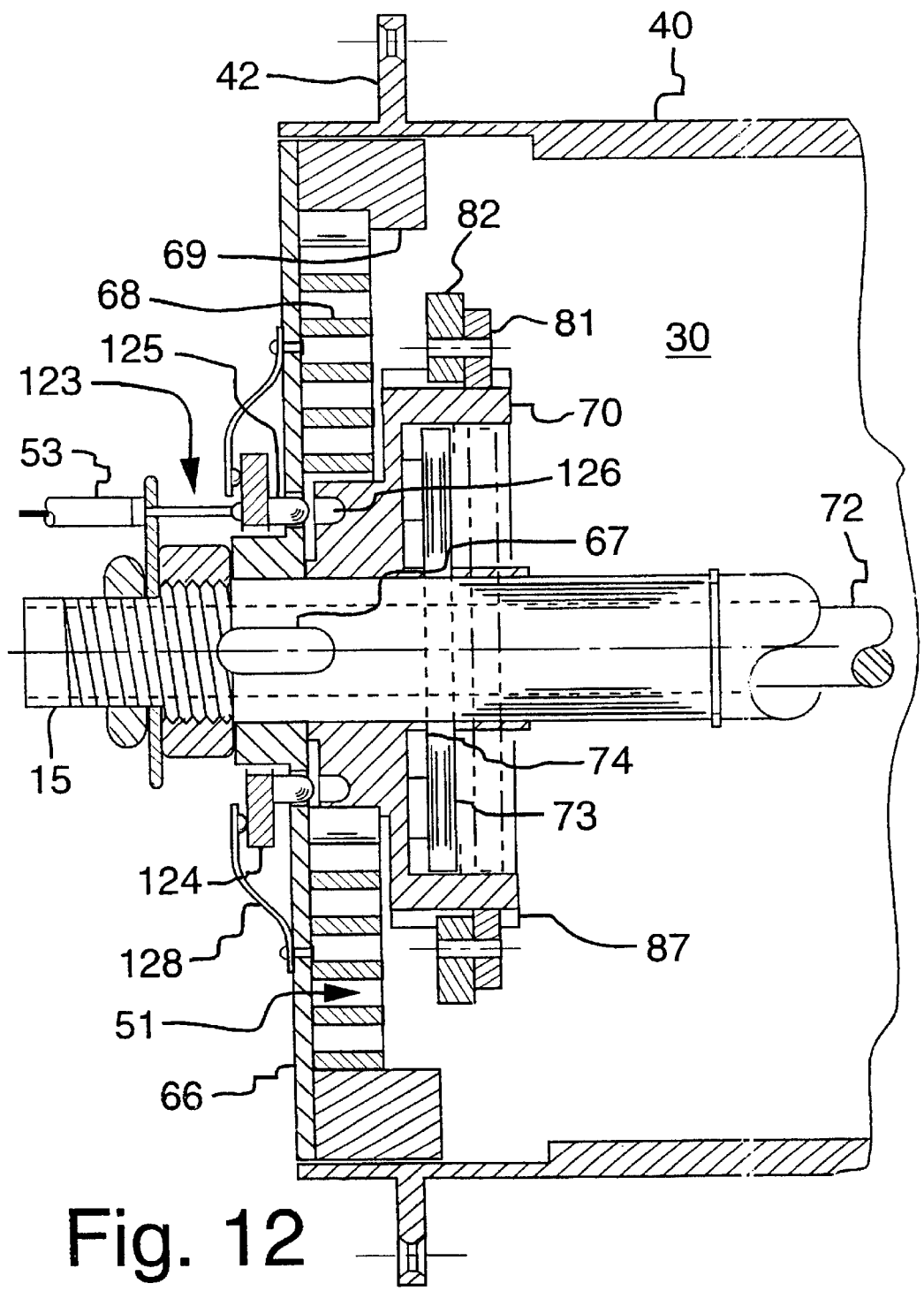
FIG. 12 is a longitudinal section of a shift position arrester according to an embodiment of the invention as a modification of FIG. 3.

In this respect, FIG. 12 shows an auxiliary annulus 124 acting on the sensor annulus 70 via corresponding coupling elements, such as pins 125 and corresponding cavities 126. The number of cavities may correspond to the number of shifting positions or flats 75, 77, 79 shown in FIGS. 4 to 6.

Such coupling elements may be manually actuated. By way of example, the kind of cable pull 53 used, for instance, in prior-art manual transmissions may be used to retain the auxiliary annulus 124 disengaged from the sensing system annulus 70 against the bias of springs 128. The auxiliary annulus 124 may be released, such as by release of the cable pull 53, whereupon the bias of springs 128 will cause pins 125 to engage cavities 126 so that the sensing sun gear 34 is no longer able to rotate the annulus 70 relative to stationary cover 66. The cable pull 53 is again actuated to pull the shift arresting elements 125 away from the sensing annulus 70, when resumption of the automatic shifting function of transmission 30 is again desired.

Within the scope of the invention, torque may be sensed electrically and/or the automatic transmission may be operated electromechanically. By way of example, FIG. 13 shows such an electrified version. The mechanical portion of such electromechanical transmission 130 may, for example, include the sprocket-driven input rotor 60, first planetary system 31 and ratchets 43, 44, 46, 48 coupled respectively to planet and ring gears 35 and 37, ratchet shifters 90 and 91, an output rotor 216 similar to the above mentioned output rotor 116, but more directly coupled to the bicycle wheel hub 40, and other mechanical parts such as shown jointly in FIGS. 3 and 13.

The electromechanical transmission 130 also includes an electrical part which, for more rapid understanding, carries reference numerals that are elevated by "100" relative to similar if not equivalent mechanical parts in embodiments shown in FIGS. 2 to 6, 10 and 11, for instance. Of course, this by way of example, and not by way of limitation.

Torque pickup in FIG. 13 may include electric gages, such as strain gages 134, picking up torque from shaft 15 which is torqued by sun gear 33 against its restraints at opposite ends of that shaft. Such strain gages preferably are mounted on opposite sides of shaft 15 at 45 degrees to the shaft axis. Bending moments of the shaft will thus be canceled and torsional forces imposed by the sun gear 33 of the humanly powered planetary system 31 can thus be made additive in an electronic torque sensor 151 that may include a strain gage reference amplifier which in a manner known per se from strain gage technology converts strain gage signals into a switching signal indicative of sensed human power torque.

Such electric torque signal 171 may be equivalent to the torque delivered by the annulus 70 shown in FIG. 3. In analogy to the cammed arrangement 80 illustrated in FIGS. 3 and 4 to 6, the circuitry of FIG. 13 may include electronic circuitry 180 of a conventional type that responds only to peaks in signal 171 whereby only peak torques are recognized. By way of example, circuitry 180 may include a torque level discriminator employing such conventional elements as Schmitt trigger circuitry, in order to convert the torque signal 171 into a tri-stable switching signal. Instability may be avoided by detecting only peak signals in the sensed output torque, and a counter that counts out the above mentioned cyclically occurring torque fluctuations may be used in the circuitry, such as at 151 to prevent erratic shifting.

The sensed torque signal 171 as processed through circuitry 180 is applied via a lead 173 to a switching circuit 174 that in analogy to shifting element 72 shown in FIG. 3 effects selective switching of the third and fourth ratchets 46 and 48. To this end, switching circuit 174 responds to the processed torque signal occurring at 173 by supplying switching signals to ratchet shifter actuators 196 and 197. By way of example, such actuators may include solenoid drivers, and the switching circuit 174 may include a solenoid driver selector which may in effect be a shifting element analogous to the shifting element 72 in the mechanical version of FIG. 3.

In this respect, solenoid driver 196 alternatively energizes spaced electromagnets 200 and 201 having the ratchet shifter 90 for the third ratchet 46 located therebetween. Similarly, solenoid driver 197 alternatively energizes spaced electromagnets 202 and 203 having the ratchet shifter 91 for the fourth ratchet 48 located therebetween. By way of example, solenoid driver 197 may be a high-low driver, shifting transmission 130 among high and low gears, and solenoid driver 196 may be an intermediate solenoid driver, shifting the transmission to and from an intermediate gear.

Accordingly, third ratchet 46 is switched to and is retained in its disabled state by energization of electromagnet 200 via driver 196. Similarly, fourth ratchet 48 is switched to and is retained in its disabled state by energization of electromagnet 202 via driver 197.

Conversely, third ratchet 46 is switched to and is retained in its enabled state by energization of electromagnet 201 via driver 196. Fourth ratchet 48 is switched to and is retained in its enabled state by energization of electromagnet 203 via driver 197.

According to an embodiment of the invention, the ratchet shifters 90 and 91 are or include permanent magnets so that electromagnets 200, 201, 202, 203, can be energized to either attract or repel their corresponding ratchet shifter 90 or 91. Preferably, solenoids or electromagnets 200 to 203 have soft iron cores so that each ratchet shifter 90 or 91 will remain at the last electromagnet that has attracted it, until its opposite electromagnet is energized. In such case, the mentioned energization of electromagnets may not be necessary for retaining a switched ratchet in a switched state, since the permanent magnetism of a ratchet shifter 90 or 91 may perform such retention on the soft iron core of the adjacent electromagnet.

In practice, the switching pattern illustrated by switching blocks 47 and 49 may be implemented in solenoid driver selector 174 and solenoid drivers 196 and 197 to effect gear shifting in a manner explained above with reference to FIGS. 2 et seq. Solenoid driver selector 174 may be programmed for that purpose or for any other desired switching pattern.

The countervailing ratchet switching actions may be given a bistable character by the above mentioned circuitry 180. Alternatively or additionally, bent springs 205 and 206. having configurations similar to one of the bumps 87 and 88 illustrated in FIGS. 4 to 6 may be provided in order to enhance the bistable character of each ratchet shifting operation. In this respect, in the mechanical version of FIG. 3, the spring 95 provides a sustained force to move ratchet shifters 90 and 91 until a ratchet shifting operation has been completed. In the electromechanical version, an extended electromotoric force or EMF maybe provided by analogy and/or springs 205 and 206 may serve to complete the motion of ratchet shifters 90 and 91, respectively, during the short delays when pawls move among their positions exemplified in FIGS. 8 and 9, for instance.

In analogy to the manual shift arrester 123 such as shown in FIG. 12, the embodiment of FIG. 13 may include a shift arrester, such as in the form of a switch 223 between torque sensor 151 and solenoid driver selector 174. Such switch is normally closed or biased to its closed position wherein gear shifting occurs in response to sensed output torque changes.

Alternatively, switch 223 is opened, such as by the type of cable pull 53 shown in FIG. 12 or by another manually exerted force 153. In this manner, supply of shifting signals to the solenoid drivers may be interrupted, whereby the electromechanical transmission 130 is manually arrested in any then prevailing shift position. Switch 223 may be released to its closed position whereby automatic switching of transmission 130 is resumed.

The automatic transmission 130 may be electrified with batteries and/or the kind of generating system used for bicycle lights.

The embodiments of FIGS. 3 and 13 employ several ball, needle or other bearings which may be of a conventional type.

Although planetary gear or hub type integral transmissions have been shown in detail and are preferred, the principles of the subject invention and of its embodiments of FIGS. 2 etc. may also be applied to derailleur type of shiftable transmissions.

Figure 14:
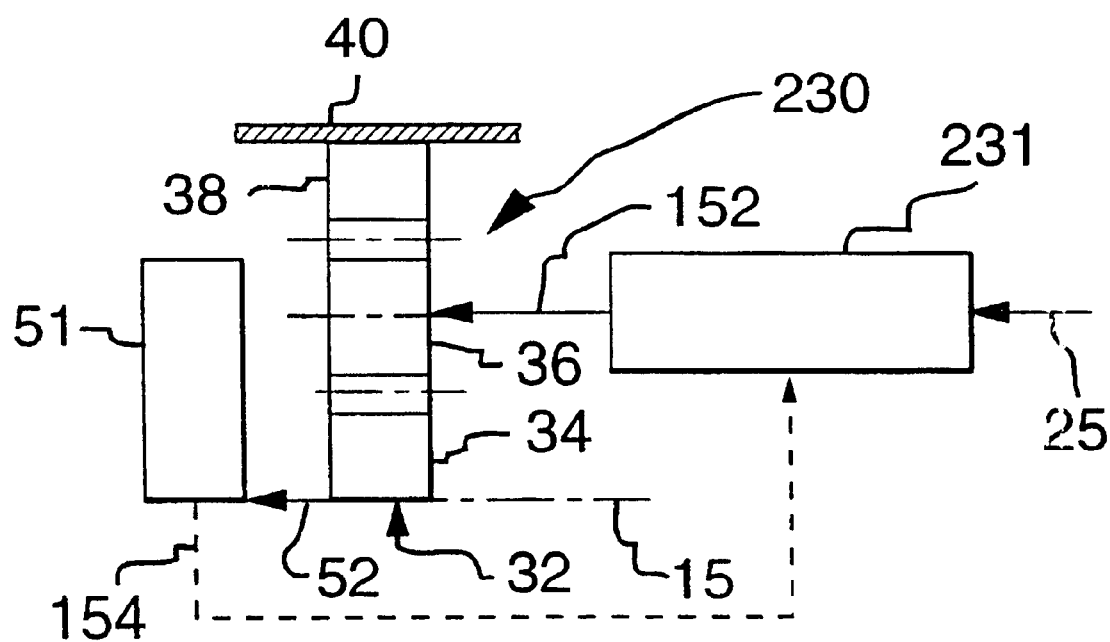
FIG. 14 is a diagrammatic view of a derailleur type of automatic transmission according to a further embodiment of the invention.

By way of example, FIG. 14 shows an automatic transmission 230 wherein a derailleur type of transmission 231 is substituted for the first planetary gear system 31 of gear type transmissions 30 and 130.

Derailleur transmissions are well known and include the tension wheel and the jockey wheels (not shown) around the chain 24 at the rear wheel 28, and the freewheel and gear cluster (not shown) in the area of sprocket wheel 25. The sprocket input again has been shown as 25, as in FIG. 2.

The torque sensing and transmission shifting system, including the secondary planetary system 32 and torque sensor 51, again may be provided according to a preferred embodiment of the invention; this time to (a) apply the rear wheel or output torque 152 of the derailleur transmission 231 to the wheel hub 40 and to (b) sense such output torque and shift the derailleur, such as indicated by dotted line 154.

Within the scope of the invention, a derailleur type of transmission system may be electrified, such as in the manner disclosed above with respect to FIG. 13. In either case, a derailleur or derailleurs is or are shifted instead of the ratchets 46 and 48.

Within the scope of the invention, the transmission may be hybrid, such as either automatic and manual or automatic gear type and derailleur manual.

Although the invention and its various aspects are herein disclosed with the aid of detailed embodiments, the invention clearly neither is limited to such details, nor to any disclosed modes of carrying out the invention. Rather, this disclosure and also the following parts thereof reveal a broad applicability of the invention and a variability going clearly beyond the elements mentioned herein as an aid to an acquisition of understanding. Accordingly, the exemplary term "such as" need to be thought as being present before each specific or numerical statement or indication.

From one aspect thereof, the invention shifts a shiftable bicycle transmission by automatically sensing output power torque of that transmission, automatically converting sensed output power torque to transmission shifting motion, and automatically shifting that shiftable transmission with said transmission shifting motion.

To this end, a shiftable bicycle driving power transmission 30, 130, 230 may have a transmission shifting element, such as 72, 154 or 174, and comprises a bicycle output power torque sensor 51, 151, and an output power torque-to-transmission shifting motion converter 68, 74, 180, having a output power torque input coupled to the output power torque sensor, such as at 52 or 171, and having a transmission shifting motion output 73, 173. The transmission shifting element 72, 174 is coupled to the transmission shifting motion output of that converter.

The output power torque may be sensed mechanically, and the output power torque sensor 51 may be a mechanical output power torque sensor 34, 52, 68. Alternatively, the output power torque may be sensed electrically, such as at 151 employing strain gages 134. The output power torque preferably is sensed inside the transmission, and the output power torque sensor 51, 134, 151 preferably is inside the transmission 30, 130, 230.

A variable corresponding to the output power torque may be developed in the transmission, and the output power torque is sensed from that variable. The output power torque sensor 51, 151 may include sun gear 34, strain gages 134 or other means for sensing a variable corresponding to the output power torque in the transmission 30, 130, 230, and a spring 68, strain gage reference amplifier 151, torque level discriminator 180 or other means for sensing that output power torque from that variable.

A planetary gear 32 may be included in transmission 30 or 230, and the above mentioned variable may be derived from such planetary gear. The output power torque sensor 51 may be coupled to that planetary gear, such as indicated at 52 in FIGS. 2, 3 and 14. Such output power torque sensor 51 may be coupled to a sun gear 34 of that planetary gear 32, or the above mentioned variable may otherwise be derived from such sun gear 34 of planetary gear 32.

First and second planetary gears 31 and 32 may be variably coupled in series in the transmission, and the above mentioned variable may be derived from one of these planetary gears, such as from the second planetary gear 32. The transmission may include first and second planetary gears 31 and 32 variably coupled in series, and the output power torque sensor 51 is coupled to one of such planetary gears, such as to the second planetary gear 32.

The shifting of the transmission may include reversing transmission of power torque through the first planetary gear, such as from the ring gear 37 to the planet gears 35 in one shift position (e.g. when third and fourth ratchets 46 and 48 are deactivated), and conversely from these planet gears 35 to that ring gear 37 in another shift position (e.g. when third and fourth ratchets 46 and 48 are activated as means for reversing that transmission of power).

The above mentioned variable may impose a strain on an element in the transmission, and the output power torque may be sensed from that strain. By way of example, the output power torque sensor may include a strain gage 134 on an element in the transmission, such as shown in FIG. 13. Such element may be a shaft 15 on which strain is imposed, and strain gage 134 may be mounted on that shaft.

Another example of such an element is the spring 68 shown in FIG. 3 on which strain is imposed, such as from sun gear 34 via coupling 52. The output power torque sensor 51 may include a spring 68 coupled to part of the transmission 30.

A derailleur 231 and gears 32 may be included in the transmission, such as shown in FIG. 14, and output torque may be sensed from such gears 32. The derailleur may then be shifted with the above mentioned transmission shifting motion, such as indicated at 154 in FIG. 14, which shows a derailleur 231 and gears 32 between that derailleur and an output 40 of transmission 230. The output power torque sensor 51 is coupled to these gears, such as at 52, and the transmission shifting element 154 is coupled to the derailleur. Gears 34, 36, 38 may be arranged in a planetary system.

The transmission may be shifted in upshifts and in downshifts, and a hysteresis 190, 191 may be imposed on the automatic shifting as between such upshifts and downshifts, such as shown in FIG. 7. Upshift shifters and downshift shifters may include the cam 74 acting on shifting element 72 and ratchets 46 and 48, and means for imposing hystereses may include cam 80 with bumps 87, 88, etc.

Energy of the sensed output torque may be stored, such as in spring 68 mechanically or in a circuit 180 electronically, and such stored energy may be metered in the automatic conversion of sensed output power torque to transmission shifting motion. Such stored energy may particularly be metered to retard upshifts in the shifting of the shiftable transmission 30, 130, 230. By way of example, such metered energy release may be effected by auxiliary planetary gearing 110 with one-way clutch 100, which also may impose a hysteresis of sorts. Upshifts preferably are retarded relative to downshifts. By way of example, upshifts are retarded while converting sensed output power torque to transmission shifting motion. Transmission 30, 130 may include upshift shifters and downshift shifters 90, 91 and shift retarders 87, 88, 100, 180.

Pursuant to a preferred embodiment of the invention, sensed output power torque is automatically converted to the transmission shifting motion in steps corresponding to shift positions of the transmission, such as (1), (2), (3), and such shiftable transmission is automatically shifted by automatically shifting that transmission with such transmission shifting motion in these steps. The output power torque-to-transmission shifting motion converter of the transmission may include a step-action converter 74, 80, 180 having a stepped transmission shifting motion output at 73 or 173.

In this or any other manner within the scope of the invention, the automatic transmission preferably has distinct shifting positions, such as (1), (2), (3), corresponding to different output power torques, and such conversion of output power torque preferably is automatically detained until the sensed output power torque has achieved a value corresponding to a distinct shifting position of that transmission. The conversion of output power torque is automatically released whenever the sensed output power torque has achieved a value corresponding to a distinct shifting position of the transmission, and such shiftable transmission is automatically shifted upon release of that conversion by applying a transmission shifting motion to that transmission. In this respect, the transmission shifting element 72, 174 has distinct shifting positions corresponding to different output power torques applied to the transmission, and the converter may have a detent 87, 88 adapted to detain output power torque-to-transmission shifting motion conversion and thereby shifting of the transmission until sensed output power torque has achieved a value corresponding to a distinct shifting position of the transmission shifting element, such as also implemented by circuit 180.

The transmission shifting element may be a translatory transmission shifting element 72, and its output power torque input is a rotary output power torque input 34, 52, 70, 74 coupled to an output power torque sensor 51, 68. The transmission shifting motion output may be a translatory transmission shifting motion output 73 coupled to that rotary output power torque input. The translatory transmission shifting element 72 may be coupled to that translatory transmission shifting motion output 73.

The transmission typically has distinct lower and higher shifting positions corresponding to different output power torques, and the conversion of output power torque is automatically detained until the sensed output power torque has achieved a value corresponding to a distinct shifting position of that transmission. The conversion of output power torque is automatically released whenever the sensed output power torque has achieved a value corresponding to a distinct shifting position of the transmission. Preferably, such conversion of output power torque is detained and is thereafter released at a hysteresis so that output power torque is released at different shift points for shifts from a lower shifting position to a higher shifting position than for shifts from a higher shifting position to a lower shifting position, and such as shown by way of example in FIG. 7. The shiftable transmission is automatically shifted at such different shift points.

Shift points for shifts from a lower shifting position to a higher shifting position preferably are lower in terms of output power torque than shift points for shifts from a higher shifting position to a lower shifting position, such as seen in FIG. 7, for instance. The transmission shifting element 72 preferably has distinct lower and higher shifting positions corresponding to different lower and higher output power torques, respectively, applied to the transmission, and the converter 74, 80 has a detent 87, 88, 100 adapted to detain output power torque-to-transmission shifting motion conversion and thereby shifting of the transmission at different shift points for shifts from a lower shifting position to a higher shifting position than for shifts from a higher shifting position to a lower shifting position.

The shiftable bicycle transmission 30, 130, 230 may be arrested in any shifting position. By way of example, a manual shift position arrester 123, 223 may be coupled to the transmission, such as by a coupling of the shift position arrester to torque sensor 51, 151, etc.

This extensive disclosure with many examples in and from the mechanical and electric arts demonstrates the broad scope of the invention and of its various aspects and embodiments, rendering apparent or suggesting to those skilled in the art various modifications and variations within the spirit and scope of the invention.

I claim:

1. A method of shifting a shiftable bicycle transmission, comprising in combination:
   automatically sensing output power torque of said transmission;
   automatically converting sensed output power torque to transmission shifting motion; and
   automatically shifting said shiftable transmission with said transmission shifting motion.

2. A method as in claim 1, wherein:
said output power torque is sensed mechanically.

3. A method as in claim 1, wherein:
said output power torque is sensed electrically.

4. A method as in claim 1, wherein:
said output power torque is sensed inside said transmission.

5. A method as in claim 1, wherein:
a variable corresponding to said output power torque is developed in said transmission; and
said output power torque is sensed from said variable.

6. A method as in claim 5, wherein:
said variable is developed with the aid of a gear element in said transmission.

7. A method as in claim 5, wherein:
a planetary gear is included in said transmission; and
said variable is derived from said planetary gear.

8. A method as in claim 7, wherein:
said variable is derived from a sun gear of said planetary gear.

9. A method as in claim 5, wherein:
first and second planetary gears are variably coupled in series in said transmission; and
said variable is derived from one of said planetary gears.

10. A method as in claim 9, wherein:
said shifting includes reversing transmission of power torque through said first planetary gear.

11. A method as in claim 9, wherein:
said variable is derived from said second planetary gear.

12. A method as in claim 5, wherein:
said variable imposes a strain on an element in said transmission; and
said output power torque is sensed from said strain.

13. A method as in claim 12, wherein:
said element is a shaft on which said strain is imposed.

14. A method as in claim 12, wherein:
said element is a spring on which said strain is imposed.

15. A method as in claim 1, wherein:
a derailleur and gears are included in said transmission;
said output torque is sensed from said gears; and
said derailleur is shifted with said transmission shifting motion.

16. A method as in claim 15, wherein:
said gears are arranged in a planetary system.

17. A method as in claim 1, wherein:
said transmission is shifted in upshifts and in downshifts; and
a hysteresis is imposed on said automatic shifting as between said upshifts and downshifts.

18. A method as in claim 1, wherein:
energy of said sensed output torque is stored; and
said stored energy is metered in the automatic conversion of sensed output power torque to transmission shifting motion.

19. A method as in claim 18, wherein:
said stored energy is metered to retard upshifts in the shifting of said shiftable transmission.

20. A method as in claim 1, wherein:
said transmission is shifted in upshifts and in downshifts; and
said upshifts are retarded relative to said downshifts.

21. A method as in claim 20, wherein:
said upshifts are retarded while converting sensed output power torque to transmission shifting motion.

22. A method as in claim 1, wherein:
said sensed output power torque is automatically converted to said transmission shifting motion in steps corresponding to shift positions of said transmission; and said shiftable transmission is automatically shifted by automatically shifting said transmission with said transmission shifting motion in said steps.

23. A method as in claim 22, wherein:

said transmission is shifted in upshifts and in downshifts; and said upshifts are retarded relative to said downshifts.

24. A method as in claim 23, wherein:

said upshifts are retarded while converting sensed output power torque to transmission shifting motion.

25. A method as in claim 1, wherein:

said transmission has distinct shifting positions corresponding to different output power torques;

said conversion of output power torque is automatically detained until said sensed output power torque has achieved a value corresponding to a distinct shifting position of said transmission;

said conversion of output power torque is automatically released whenever said sensed output power torque has achieved a value corresponding to a distinct shifting position of said transmission; and said shiftable transmission is automatically shifted upon release of said conversion by applying a transmission shifting motion to said transmission.

26. A method as in claim 1, wherein:

said transmission has distinct lower and higher shifting positions corresponding to different output power torques;

said conversion of output power torque is automatically detained until said sensed output power torque has achieved a value corresponding to a distinct shifting position of said transmission;

said conversion of output power torque is automatically released whenever said sensed output power torque has achieved a value corresponding to a distinct shifting position of said transmission;

with said conversion of output power torque being detained and being released at a hysteresis so that output power torque is released at different shift points for shifts from a lower shifting position to a higher shifting position than for shifts from a higher shifting position to a lower shifting position; and said shiftable transmission is automatically shifted at said different shift points.

27. A method as in claim 26, wherein:

shift points for shifts from a lower shifting position to a higher shifting position are lower in terms of output power torque than shift points for shifts from a higher shifting position to a lower shifting position.

28. A method as in claim 1, wherein:

said shiftable bicycle transmission is arrested in any shifting position.

29. A method as in claim 1, wherein:

input power torque applied to said transmission is equalized by coupling each foot of a bicycle rider to a pedal of the bicycle.

30. A shiftable bicycle driving power transmission having a transmission shifting element, comprising in combination:

a bicycle output power torque sensor; and an output power torque-to-transmission shifting motion converter having an output power torque input coupled to said output power torque sensor and having a transmission shifting motion output;

said transmission shifting element coupled to said transmission shifting motion output of said converter.

31. A transmission as in claim 30, wherein:

said output power torque sensor is a mechanical output power torque sensor.

32. A transmission as in claim 30, wherein:

said output power torque sensor is an electromechanical output power torque sensor.

33. A transmission as in claim 30, wherein:

said output power torque sensor is inside said transmission.

34. A transmission as in claim 30, wherein:

said output power torque sensor includes means for sensing a variable corresponding to said output power torque in said transmission; and means for sensing said output power torque from said variable.

35. A transmission as in claim 30, wherein:

said output power torque sensor includes a gear element in said transmission.

36. A transmission as in claim 30, wherein:

said transmission includes a planetary gear; and said output power torque sensor is coupled to said planetary gear.

37. A transmission as in claim 36, wherein:

said output power torque sensor is coupled to a sun gear of said planetary gear.

38. A transmission as in claim 36, wherein:

said transmission includes first and second planetary gears variably coupled in series; and said output power torque sensor is coupled to one of said planetary gears.

39. A transmission as in claim 38, including:

means for reversing transmission of power torque through said first planetary gear coupled to said transmission shifting element.

40. A transmission as in claim 38, wherein:

said output power torque sensor is coupled to said second planetary gear.

41. A transmission as in claim 30, wherein:

said output power torque sensor includes a strain gage on an element in said transmission.

42. A transmission as in claim 41, wherein:

said element is a shaft; and said strain gage is mounted on said shaft.

43. A transmission as in claim 30, wherein:

said output power torque sensor includes a spring coupled to part of said transmission.

44. A transmission as in claim 30, including:

a derailleur and gears between said derailleur and an output of said transmission;

said output power torque sensor is coupled to said gears; and said transmission shifting element is coupled to said derailleur.

45. A transmission as in claim 44, wherein:

said gears are in a planetary system.

46. A transmission as in claim 30, wherein:

said transmission includes upshift shifters and downshift shifters; and means for imposing a hysteresis on said upshift and downshift shifters.

47. A transmission as in claim 30, wherein:

said bicycle output power torque sensor includes a sensed output torque energy storing device; and said output power torque-to-transmission shifting motion converter includes a stored energy metering device.

48. A transmission as in claim 47, wherein:

said stored energy metering device is a unidirectional upshift retarding device.

49. A transmission as in claim 30, wherein:

said transmission includes upshift shifters and downshift shifters; and shift retarders selectively coupled to said upshift shifters.

50. A transmission as in claim 30, wherein:

said converter is a step-action converter having a stepped transmission shifting motion output.

51. A transmission as in claim 50, wherein:

said transmission includes upshift shifters and downshift shifters; and means for imposing a hysteresis on said upshift and downshift shifters.

52. A transmission as in claim 50, wherein:

said transmission includes upshift shifters and downshift shifters; and shift retarders selectively coupled to said upshift shifters.

53. A transmission as in claim 30, wherein:

said transmission shifting element has distinct shifting positions corresponding to different output power torques applied to said transmission;

said converter has a detent adapted to detain output power torque-to-transmission shifting motion conversion and thereby shifting of said transmission until sensed output power torque has achieved a value corresponding to a distinct shifting position of said transmission shifting element.

54. A transmission as in claim 30, wherein:

said transmission shifting element is a translatory transmission shifting element;

said output power torque input is a rotary output power torque input coupled to said output power torque sensor;

said transmission shifting motion output is a translatory transmission shifting motion output coupled to said rotary output power torque input; and said translatory transmission shifting element is coupled to said translatory transmission shifting motion output.

55. A transmission as in claim 30, wherein:

said transmission shifting element has distinct lower and higher shifting positions corresponding to different lower and higher output power torques, respectively, applied to said transmission; and said converter has a detent adapted to detain output power torque-to-transmission shifting motion conversion and thereby shifting of said transmission at different shift points for shifts from a lower shifting position to a higher shifting position than for shifts from a higher shifting position to a lower shifting position.

56. A transmission as in claim 30, including:

a manual shift position arrester coupled to said transmission.

57. A transmission as in claim 56, including:

a coupling of said shift position arrester to said torque sensor.

58. A transmission as in claim 30, including:

foot-to-pedal couplings from each foot of a bicycle rider to each bicycle pedal, associated with said transmission.

* * * * *